Figure 1:
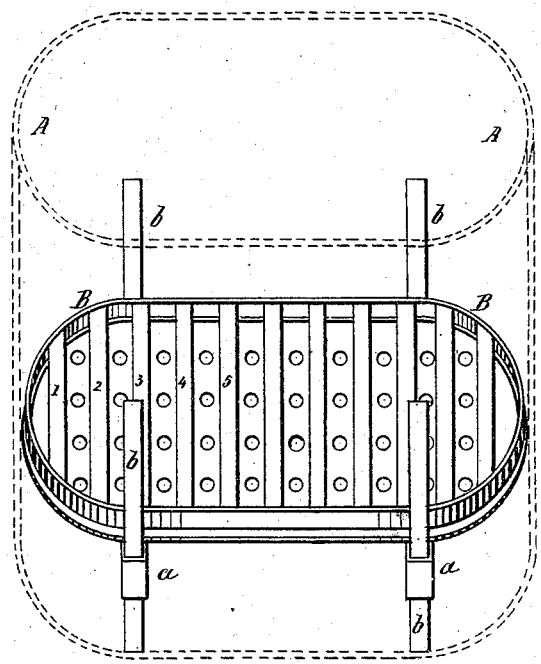
Figure 2:
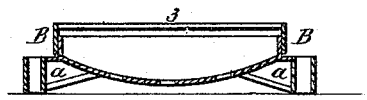

ISABELLA C. SCHRAMM.

Boiler-Attachment for Cooking and Washing.

No. 131,789. Patented Oct. 1, 1872.

Witnesses:
A. Rawson.
F. W. Colé.

Isabella C. Schramm,
Inventor:
Thomas G. Orwig, Atty.

UNITED STATES PATENT OFFICE.

ISABELLA C. SCHRAMM, OF DES MOINES, IOWA.

IMPROVEMENT IN BOILER ATTACHMENTS FOR COOKING AND WASHING.

Specification forming part of Letters Patent No. 131,789, dated October 1, 1872.

*To all whom it may concern:*

Be it known that I, ISABELLA C. SCHRAMM, of Des Moines, in the county of Polk and State of Iowa, have invented a certain Improved Boiler Attachment for Cooking and Washing, of which the following is a specification:

The object of my invention is to provide a simple, portable, and adjustable device that can be placed within a boiler and used alternately to aid in washing clothes and in cooking food; and it consists in a concave colander with adjustable feet and a cover composed of rods or bars, as hereinafter fully set forth.

My drawing is a miniature perspective view, showing my attachment within a common wash-boiler and illustrating its construction and operation.

A A is a wash-boiler of common form. B B is the colander part of my attachment. It is concave and perforated, and may be oblong, round, or square, and vary in size and shape to correspond with sizes and shapes of variously-formed boilers. It may be pressed and perforated by stamp and dies. *a* represents a combined loop and rest. One of these is permanently attached at each corner, or, when made for a round boiler, on three sides. They serve as a base to keep the colander in an upright position when used outside of the boiler. The loop formed and combined with these rests serves to hold the adjustable feet. *b b* are adjustable feet, made of a straight rod or bar, and may be metal or wood, flat, square, or round, to correspond with the form of the loops through which they are designed to slide. 1 2 3 4 5 represent a series of bars or rods covering the colander B B. They may be permanently attached to the colander; or they may be connected by means of a rim, and hinged or fitted to the colander in such a manner that they can be opened and removed, when desired, in order that the colander may be used for various culinary purposes.

To operate my attachment for washing clothes, remove the adjustable feet and place it in the bottom of the boiler. Place the garments on top of the attachment, put in soap and water, place on the cover, and boil over a fire. The steam will generate in the colander and force upward through the mass of clothing, condense above the colander, and return as water to the colander. A pulsating automatic action thus produced forces the steam and water alternately up and down through the clothing and cleanses it.

I am aware that this process of washing is not new; but I claim that my attachment is a new means of accomplishing the result.

To cook food, place a piece of meat in the boiler, cover it with water, insert and adjust the feet *b b* so that the attachment will be supported when placed in the boiler; place potatoes or other vegetables on the series of bars, cover the boiler, and boil the water. While the meat is cooking in the water the vegetables will be cooked by the steam above the water.

I am aware that various means are in use for cooking and steaming several kinds of food in one vessel at the same time. I am also aware that the mode of attaching and adjusting the feet *b b* and the manner of combining the bars with the colander are common mechanism, and that the novelty and utility of my invention consist in the peculiar device described as a new article of manufacture, adapted for the various purposes specified.

*Claim.*

I claim as my invention—

The movable or hinged skeleton cover, composed of the series of bars 1 2 3 4 5, combined with the colander B B, for the purposes specified.

ISABELLA C. SCHRAMM.

Witnesses:
J. K. MARSH,
A. L. HIGGINS.